United States Patent
Lauzon et al.

(10) Patent No.: US 6,438,294 B1
(45) Date of Patent: Aug. 20, 2002

(54) OPTICAL FIBER PUMPING APPARATUS AND METHOD FOR USE IN PUMPED OPTICAL FIBER AMPLIFIER AND LASER SYSTEMS

(75) Inventors: Jocelyn Lauzon, St-Augustin-de-Desmaures (CA); Min Wang, Dallas, TX (US); Yves Taillon, St-Augustin-de-Desmaures; Robert Larose, Ste-Foy, both of (CA)

(73) Assignee: Institut National d'Optique, Sainte-Foy (CA)

( * ) Notice: Subject to any disclaimer, the term of this patent is extended or adjusted under 35 U.S.C. 154(b) by 0 days.

(21) Appl. No.: 09/484,532

(22) Filed: Jan. 18, 2000

(51) Int. Cl.⁷ .................................................. G02B 6/42
(52) U.S. Cl. ........................................ 385/38; 372/6
(58) Field of Search ................................ 372/6, 69–75; 385/38, 31, 33

(56) References Cited

U.S. PATENT DOCUMENTS

| | | | |
|---|---|---|---|
| 4,815,079 A | * 3/1989 | Snitzer et al. | 372/6 |
| 5,268,978 A | * 12/1993 | Po et al. | 385/33 |
| 5,533,163 A | 7/1996 | Muendel | |
| 5,659,644 A | * 8/1997 | DiGiovanni et al. | 385/31 |
| 5,721,636 A | 2/1998 | Erdogan et al. | |
| 5,790,722 A | 8/1998 | Minden et al. | |
| 6,256,327 B1 | * 7/2001 | Goldberg | 372/22 |

FOREIGN PATENT DOCUMENTS

EP 0989638 A1 * 3/2000 ................... 385/38

OTHER PUBLICATIONS

Scalable, end–pumped, diode–laser–pumped laser, Optics Letters, vol. 14, No. 19, Oct. 1989, pp 1057–1059.
"High–Efficiency side–coupling of light into double–cladding fibers using imbedded V–grooves",OFCψ96 Technical Digest, 1996, pp. 91–92.

* cited by examiner

*Primary Examiner*—Akm E. Ullah
(74) *Attorney, Agent, or Firm*—Ogilvy Renault; James Anglehart

(57) ABSTRACT

An optical fiber pumping apparatus for use with a double-cladding fiber in an optical amplifier or laser configuration comprises a plurality of laser diodes used as pump sources disposed in a spatial configuration for radiating pump energy along an optical axis through a surrounding generally annular area, leaving an available middle area. The apparatus further comprises an optical coupling device having an optical input portion generally aligned with the optical axis to collect the pump energy and having an optical output portion aligned with the pumping input portion for transferring the pump energy to the inner cladding surrounding the doped core of the fiber. The apparatus exhibits high pump power rating and allows efficient input signal coupling in optical fiber amplifier applications. According to the different preferred embodiments, the apparatus can act either simultaneously or independently as a pump combiner, multiple pump injector, signal coupler or pump/signal multiplexer/demultiplexer.

38 Claims, 2 Drawing Sheets

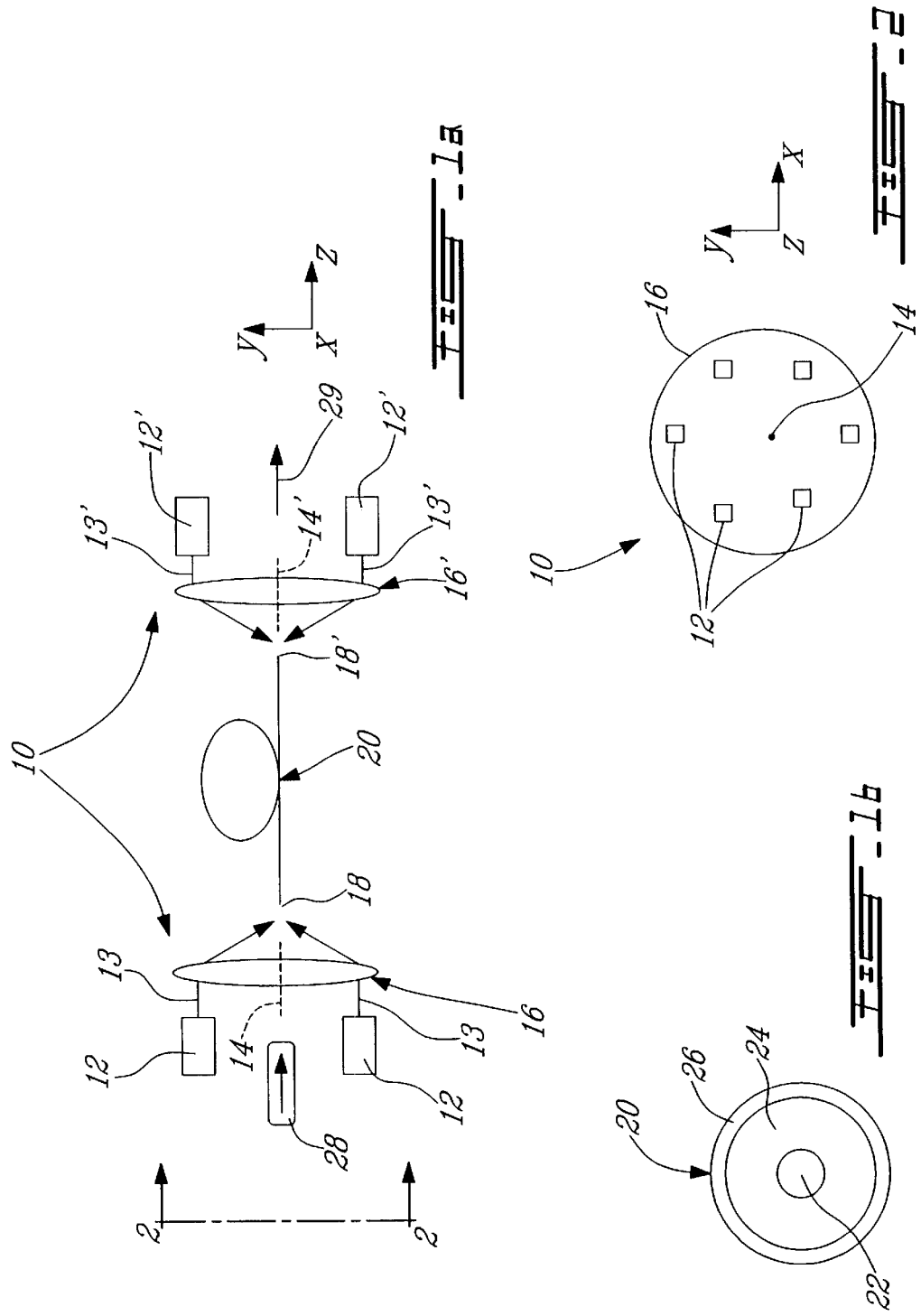

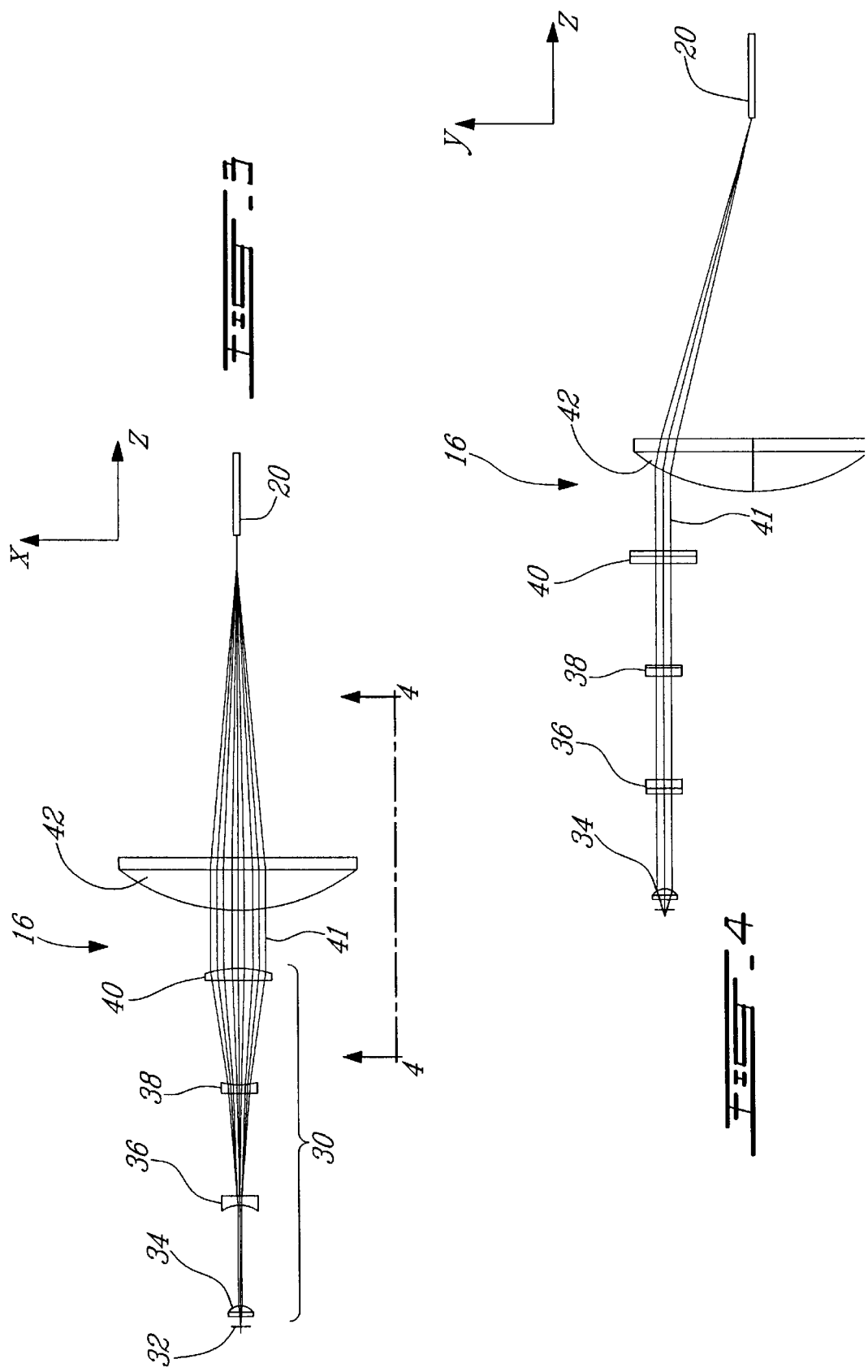

OPTICAL FIBER PUMPING APPARATUS AND METHOD FOR USE IN PUMPED OPTICAL FIBER AMPLIFIER AND LASER SYSTEMS

FIELD OF THE INVENTION

The invention relates to the field of optical fiber power amplifier and laser systems used for optical communications, and more particularly to optical fiber pumping apparatus and method for use with a double-cladding fiber in an optical signal amplifier or laser configuration.

BACKGROUND OF THE INVENTION

Over the past years, there has been a constant need to increase the output power of fiber amplifiers and lasers to comply with requirements of modern electronic communication techniques, such as Dense Wavelength Division Multiplexing (DWDM) optical communication, wherein multiple data channels share the available amplifier output power for providing simultaneous channels amplification. Optical Inter-Satellite Links (OISL) is another growing application wherein a diffraction-limited beam has to be emitted in free-space and received thousands of kilometers away. In the latter case, propagation distances involved prescribe high-power, and the diffraction-limited quality of the optical beam requires the use of single-mode optical fiber amplifiers. For similar reasons, some particular applications of Light Detection And Ranging (LIDAR) require high-power fiber lasers.

The power output of fiber lasers and amplifiers is directly related to the absorbed pump power in the amplifying, rare-earth-doped fiber section, and thus it is related to the amount of pump power that can be coupled to a single fiber. The amplified signal has to be transversally single-mode in order to have stable amplification and diffraction-limited output with high output power. Thus, the amplification doped region must be confined to a single-mode core. For optical amplification to occur, the pump must overlap with the signal in this single-mode doped core. The coupling of a pump signal into a single-mode core may be performed with a small area laser diode. In practice, the diode active area must be smaller than the diameter of the single-mode core to allow an efficient coupling. Reducing the pump diode active area limits its output power proportionally, which in turn limits the output power of the fiber amplifier. A known way to get around this limitation in an optical fiber amplifier application is disclosed in U.S. Pat. No 5,721,636 to Erfogan et al., which consists in providing a linear array of pump lasers coupled to a plurality of series connected amplifier fiber sections using a coupler an a plurality of routers. Another pumping approach applied to a Nd:YAG laser is taught by Fan et al. in a paper entitled "Scalable, end-pump, diode-laser-pumped laser" *Optics Letters,* Vol. 14, No. 19, October 1989, pp. 1057–1059. In that paper, there is proposed to couple a multiple-diode pump source to the Nd:YAG laser, wherein the beam generated by each laser diode is collimated individually to be directed to a large focusing lens providing pump energy injection into the Nd:YAG laser. Another known way to increase the pump power of optical fiber lasers and amplifiers consists in using a double-cladding rare-earth doped fiber. The high-power, broad beam pump radiation generated by the laser diode signal is coupled to a larger multi-mode inner cladding inside which a rare-earth doped single-mode core of a higher index of refraction is contained. The inner cladding is usually surrounded by an outer cladding having a lower index of refraction to prevent radiation from propagating out of the inner cladding. Such known optical fiber structure is disclosed in U.S. Pat. No. 4,815,079 issued to Snitzer et al., which also discloses side coupling configurations for pumping of radiation into the inner cladding. In a typical optical fiber application, an input signal injected within the core is amplified through pump energy transfer from the inner cladding, while in a typical optical fiber laser application, a pair of spaced grating reflectors integrated within the receiving fiber forms an optical resonating cavity allowing the pump energy to be converted to a power laser beam. Many configurations for double-cladding fiber amplifiers or lasers, with many pump/signal multiplexing/demultiplexing approaches are disclosed by Goldberg et al. in the paper entitled "High-efficiency side-coupling of light into double-cladding fibers using imbedded V-grooves", *OFC'96 technical Digest,* 1996, pp. 91–92, in international PCT application published under No. WO 95/10868 naming Gapontsev et al. as inventors, in U.S. Pat. No. 5,790,722 issued to Minden et al. and in U.S. Pat. No. 5,659,644 to DiGiovanni et al. Although those prior references teach the use of a double-cladding fiber, all disclose the use of a single pump source, thus limiting the pump power that could be transferred to the core via a side coupling with the inner cladding, such as taught by Goldberg et al. and Gapontsev et al., or via an end coupling with the inner cladding, such as taught by Minden et al. and DiGiovanni et al.

In order to further increase the output power, it is also known to use laser diode linear arrays as disclosed in U.S. Pat. No. 5,268,978 issued to Po et al. and in U.S. Pat. No. 5,533,163 issued to Muendel, wherein particular optical coupling devices are proposed for combining the individual laser beams of the diodes included in the array into a single output beam to be pumped into the inner cladding of a double-cladding optical fiber laser. Although representing improvements over prior pump devices using conventional fibers, the pump power that can be transferred to the double-cladding fiber with those multi-pump source devices is inherently limited to the number of laser diodes that can be physically integrated in the linear array.

Moreover, apart from fiber manufacturing techniques, the multiplexing/demultiplexing of the pump and the signal is an important challenge associated with the double-cladding fiber amplifier configuration. Since the signal is to be injected in or extracted from the single-mode inner core and the pump power is to be injected in the multi-mode inner cladding closely surrounding the core, traditional fusion fiber coupling to one end of the amplification medium is no more possible. There is still a need for improved optical pumping fiber techniques and devices that can further increase the pump power that can be transferred to a double-cladding fiber in amplifier/laser applications, while allowing reliable and efficient input signal coupling when used in fiber amplifier applications.

SUMMARY OF THE INVENTION

It is an object of the present invention to provide apparatus and method for optical pumping of a double-cladding fiber in amplifier or laser configuration which are simple and reliable, while exhibiting high pump power rating.

It is another object of the present invention to provide apparatus and method for optical pumping of a double-cladding fiber in an amplifier configuration that allow simultaneous efficient input signal coupling.

According to one or both of the above objects, from a broad aspect of the present invention, there is provided an optical fiber pumping apparatus for use with a double-cladding fiber in an optical amplifier or laser configuration, said fiber including a single-mode core doped with an active material and disposed within an inner multi-mode cladding surrounded by an outer cladding, said inner cladding being provided with a pumping input portion located at an input end of the inner cladding. The apparatus comprises a plurality of pump sources disposed in a spatial [configuration] arrangement for radiating pump energy along an optical axis through a surrounding generally annular area while leaving a middle area for one of an input optical signal injection into the core and an output optical signal extraction from the core, and an optical coupling device having an optical input portion generally aligned with the optical axis to collect the pump energy and having an optical output portion aligned with the pumping input portion for transferring the pump energy to the inner cladding.

From another broad aspect of the present invention, there is provided an optical fiber pumping apparatus for use with a double-cladding fiber length in an optical amplifier or laser configuration, said fiber including a single-mode core doped with an active material and disposed within an inner multi-mode cladding surrounded by an outer cladding, said inner cladding being provided with first and second spaced pumping input portions located at opposed first and second input ends of the inner cladding. The apparatus comprises a first set of pump sources disposed in a first spatial [configuration] arrangement for radiating pump energy along a first optical axis through a surrounding generally annular area while leaving a middle area for one of an input optical signal injection into the core and an output optical signal extraction from the core and a first optical coupling device having an optical input portion generally aligned with the first optical axis to collect the pump energy, and having an optical output portion aligned with the first pumping input portion for transferring the pump energy to the inner cladding. The apparatus further comprises a second set of pump sources disposed in a second spatial [configuration] arrangement for radiating further pump energy along a second optical axis through a surrounding generally annular area and a second optical coupling device having an optical input portion generally aligned with the second optical axis to collect the further pump energy, and having an optical output portion aligned with the second pumping input portion for transferring the further pump energy to the inner cladding.

From another broad aspect of the present invention. there is provided a pumped optical fiber system comprising a double-cladding fiber in one of an optical signal amplifier and laser configuration, said fiber including a single mode core doped with an active material and disposed within an inner multi-mode cladding surrounded by an outer cladding, said inner cladding being provided with a pumping input portion located at an input end of the inner cladding. The apparatus further comprises a plurality of pump sources disposed in a spatial arrangement for radiating pump energy along a optical axis through a surrounding generally annular area while leaving a middle area for one of an input optical signal injection into the core and an output optical signal extraction from the core, and an optical coupling device having an optical input portion generally aligned with the optical axis to collect the pump energy and having an optical output portion aligned with the pumping input portion for transferring the pump energy to the Inner cladding.

From another broad aspect of the present invention, there is provided a pumped optical fiber system comprising a double-cladding fiber in one of an optical signal amplifier and laser configuration, said fiber including a single mode core doped with an active material and disposed within an inner multi-mode cladding surrounded by an outer cladding, said inner cladding being provided with first and second spaced pumping input portions located at opposed first and second input ends of the inner cladding. The apparatus further comprises a first set of pump sources disposed in a first spatial arrangement for radiating pump energy along a first optical axis through a surrounding generally annular area while leaving a middle area for one of an input optical signal injection into the core and an output optical signal extraction from the core, and a first optical coupling device having an optical input portion generally aligned with the first optical axis to collect the pump energy and having an optical output portion aligned with the first pumping input portion for transferring the pump energy to the inner cladding. The apparatus further comprises a second set of pump sources disposed in a second spatial arrangement for radiating further pump energy along a second optical axis through a surrounding generally annular area, and a second optical coupling device having an optical input portion generally aligned with the second optical axis to collect the further pump energy and having an optical output portion aligned with the second pumping input portion for transferring the further pump energy to the inner cladding.

From a further broad aspect of the present invention, there is provided an optical fiber pumping method for use with a double-cladding fiber in an optical amplifier or laser configuration, said fiber Including a single-mode core doped with an active material and disposed Within an inner multi-mode cladding surrounded by an outer cladding, said inner cladding being provided with a first pumping input portion located at a first input end of the inner cladding. The method comprises the steps of: i) radiating pump energy parallel to a first optical axis from a plurality of sources disposed in a first spatial arrangement through a generally annular area surrounding the first optical axis while leaving a middle area for one of an input optical signal injection into the core and an output optical signal extraction from the core; ii) collecting the pump energy; and iii) transferring the pump energy to the inner cladding at the first pumping input portion.

BRIEF DESCRIPTION OF THE DRAWINGS

Preferred embodiments of the apparatus and method according to the present invention will now be described in detail in view of the accompanying drawings in which:

FIG. 1a is a schematic representation of a preferred embodiment of an optical fiber pumping apparatus for use with a double-cladding fiber in an optical amplifier/laser configuration.

FIG. 1b is a cross-sectional end view of a conventional double-cladding optical fiber to be pumped with the apparatus of the present invention.

FIG. 2 is end view according of the embodiment of FIG. 1 according to line 2—2 along z axis, which shows the annular configuration of the pump sources.

FIG. 3 is a top view of a quasi-collimating lens set with a focusing lens as part of an optical coupling device that can be used to build an apparatus according to the present invention.

FIG. 4 is a side view of the quasi-collimating lens set shown in FIG. 3 according to line 4—4 along x axis.

DETAILED DESCRIPTION OF THE PREFERRED EMBODIMENTS

According to the different preferred embodiments which will be described later in detail, the apparatus of the present invention can act either simultaneously or independently as a pump combiner, multiple pump injector, signal coupler or pump/signal multiplexer/demultiplexer. Referring now to FIG. 1, the optical fiber pumping apparatus generally designated at 10, comprises a first set of laser diodes 12 used as pump sources, which are disposed in a spatial arrangement on a support (not shown). As better shown in FIG. 2, the diodes 12 radiates pump energy indicated at 13 along a first optical axis 14 parallel to z axis, through a surrounding generally annular area, leaving a middle area available for other purposes, as explained later in detail. While the set of sources 12 are preferably disposed in a simple coplanar arrangement, it is to be understood that more complex spatial arrangement for the pump sources can be implemented, provided the pump energy is radiated through the generally annular area surrounding the optical axis 14. Associated with the first set of laser diodes 12, the apparatus 10 is provided with a first optical coupling device schematically represented at 16 in FIGS. 1 and 2, which has an input portion generally aligned with the first optical axis 14 to collect the pump energy, and having an optical output portion aligned with a first pumping input portion 18 of a conventional double-cladding fiber length represented at 20.

Turning now to FIG. 1b, the fiber 20 includes a single-mode core 22 doped with an active material and disposed within an inner multi-mode cladding 24 surrounded by an outer cladding 26. As well known in the art, materials used to form inner cladding 26 and outer cladding 26 are selected in a such way that the refraction index of the inner cladding 26 is significantly higher than the refraction index of the outer cladding, to provide complete reflection of the injected pump energy toward the inner cladding at interface with the outer cladding. In an analog way, the material from which the core 22 is made exhibits a refraction index significantly higher than the refraction index of the inner cladding, ensuring that the pump energy is in turn transferred to the doped core. For optical fiber laser applications, the double-cladding fiber 20 is either coupled to a modular laser device or is provided with an integrated pair of spaced grating reflectors forming an optical resonating cavity allowing the pump energy to be converted to a power laser beam, as well known in the art. The pumping apparatus according to the present invention may also be adapted to other fiber structures, such as offset core fiber structures or polygonal-section core fiber structure.

While in the example shown in FIG. 2, a number of six (6) laser diodes are substantially equidistantly distributed about the optical axis 14, other configurations involving a different number of sources and/or a different spatial distribution of the sources, either symmetrical or asymmetrical, can be contemplated, provided an appropriate coupling to the receiving double-cladding fiber is effected. In practice, the number of pump sources used, and consequently the pump power available, is only limited by the volume associated with each laser diode package and the dimensions of the optical coupling device 16 used. In the other hand, it may be desirable in some applications to use a reduced number of pump sources according to the same spatial arrangement provided by the present Invention. For example, through known numerical simulation techniques, it is possible to design an optical coupling device adapted to match with a coplanar annular arrangement of a set of four (4) broad-area laser diodes featuring emission area of 1×100 $\mu$m and divergence of about 40×12°, which features can be readily found in laser diodes available in the marketplace, for example from Uniphase Laser Enterprises, with output power larger than 3W. A double-cladding fiber provided with a 200 $\mu$m multi-mode inner cladding showing a 0.28 numerical aperture, and provided with a centered inner rare-earth doped core having a sufficiently narrow diameter to allow singlemode propagation in the near-infrared region of the spectrum (about 6 $\mu$m diameter) has been chosen. The double-cladding fiber geometry used is convenient and feasible by the specialty fiber manufacturing industry, either with an all-glass or polymer cladding approach.

According to the embodiment shown in FIG. 1, the apparatus may further comprise a second set of laser diodes 12' used as further pump sources, which are also disposed in a spatial configuration for radiating further pump energy indicated at 13' along a second optical axis 14' through a surrounding generally annular area, In a similar way as described before with reference to FIG. 2. Associated with the second set of laser diodes 12', the apparatus is further provided with a second optical coupling device schematically represented at 16' in FIG. 1, which has an input portion generally aligned with the second optical axis 14' to collect the further pump energy. and having an optical output portion aligned with a second pumping input portion 18' of the double-cladding fiber length 20. It can be seen from FIG. 1 that first and second pumping input portion 18 and 18' of the fiber length 20 are in an opposed spaced relationship, allowing a dual pumping configuration to provide more power, and are preferably located at opposed ends of the fiber length 20.

In a case where the apparatus 10 as shown in FIG. 1 is used in a fiber amplifier configuration, there is provided an optical signal input device 28 for injecting an optical signal to be amplified into a signal input portion of the core 22 shown in FIG. 1b, providing the multiplexing of the optical signal with the pump energy, in a co-propagation mode. Through the available middle area defined by the spatial arrangement of the set of pump sources, an optical input signal, such as a signal coming from an inner single-mode core having an appropriate divergence, i.e. not larger than the divergence of the multi-mode inner cladding, can be either injected inserted or extracted without interfering with the diode pump distribution. Moreover, feedback mechanisms, and other potentially interesting optical elements, can be located within this middle area to adapt the signal output to some particular applications. It is to be understood that the signal input portion of the core 22 may be located thereon in a such manner to inject the signal in a counter-propagation direction with reference to the pump energy transferred to the inner cladding. For example, the optical signal input device 28 shown in FIG. 1 may be disposed in front of the second input portion 18', with the pump energy being provided by a single set of laser diodes 12 and optical coupling device 16.

Conveniently, the signal input portion of the core is surrounded by the first signal pumping input portion 18 in the example shown. In such fiber amplifier configuration, the optical coupling device 16 is further used to collect and transfer the optical signal to the core 22. As a result, an amplified optical signal is generated at an optical signal output portion of the core 22, which is located adjacent to pumping input portion 18' in the example shown in FIG. 1, providing the demultiplexing or extraction of the amplified optical signal with the pump energy, in a counter-propagation mode. The second coupling device 16' is further used to collect and direct the amplified signal shown by arrow 29 which can be further redirected as desired.

According to an alternate, more basic embodiment, a single set of laser diodes 12 and a single optical coupling device 16 can be combined with the double fiber length 20, to reduce the cost of the apparatus for applications requiring moderate levels of pump power. Such basic apparatus can also be used in a fiber amplifier configuration, by providing an optical signal input device 28 in a same arrangement as shown in FIG. 1, providing the multiplexing of the optical signal with the pump energy, in a co-propagation mode. As a result, an amplified optical signal is generated at an optical signal output portion of the core 22, which amplified signal can be redirected as desired.

Referring to FIGS. 3 and 4, the optical design of an optical coupling device used in the preferred embodiments described above will now be described in detail. The optical coupling device generally designated at 16 comprises a plurality of quasi-collimating sets 30 of lenses, only one of such set 30 is illustrated in FIGS. 3 and 4 for the ease of illustration. Each lens set 30, which can be qualified as collimating lens set for all practical purposes, is disposed in front of a respective pump diode located at point 32 in FIGS. 3 and 4, for redirecting the pump energy into a plurality of pump energy beams 41. The lens set 30, which is preferably anamorphic, is made of an aspheric lens 34 in series with three cylindrical lenses 36, 38 and 40 in the example shown, according to a piano-convex aspheric geometry. The optical coupling device 16 further comprises in series with the lens set 30 a larger focusing lens 42 used for converging the pump energy beams 41 to the pumping input portion 18 or 18' of the inner cladding of the fiber 20 as shown in FIG. 1. The focusing lens 42 is preferably of a the plano-convex aspheric type, and has an optical axis being aligned with the optical axis 14 or 14'. As for the single-mode signal injection/extraction the use of a plano-convex aspheric focusing lens alone may not be sufficient to insure adequate collimating and coupling. However, with an appropriate quasi-collimating lens set adapted to the signal properties, one can expect signal losses to be smaller than 10%. The available diameter for signal collimating/coupling in the middle area of the focusing lens 42 is approximately 40 mm when a large focusing lens with a diameter of 80 mm is used. With respect to the four-diode configuration described above, an estimated coupling efficiency of about 80% can be achieved using the proposed optical coupling device. It is to be understood that other appropriate optical designs can be used to implement the optical coupling device 16 or 16'. It can be appreciated that the pump power available is only limited by the volume associated with each pump diode package, the volume of the each lens set 30 and the diameter of each large focusing lens 42.

We claim:

1. An optical fiber pumping apparatus for use with a double-cladding fiber in an optical amplifier or laser configuration, said fiber including a single-mode core doped with an active material and disposed within an inner multi-mode cladding surrounded by an outer cladding, said inner cladding being provided with a pumping input portion located at an input end of said inner cladding, said apparatus comprising:
   a plurality of pump sources disposed in a spatial arrangement for radiating pump energy along an optical axis through a surrounding generally annular area while leaving a middle area for one of an input optical signal injection into the core and an output optical signal extraction from the core; and
   an optical coupling device having an optical input portion generally aligned with said optical axis to collect said pump energy and having an optical output portion aligned with said pumping input portion for transferring the pump energy to said inner cladding.

2. The apparatus according to claim 1, wherein said spatial arrangement is coplanar.

3. The apparatus according to claim 1, wherein said pump sources are laser diodes.

4. The apparatus according to claim 1, wherein said optical coupling device comprises collimator means disposed in front of said pump sources for redirecting said pump energy into a plurality of pump energy beams and optical focusing means for converging the pump energy beams to the pumping input portion of said inner cladding.

5. The apparatus according to claim 4, wherein said collimator means include a plurality of collimators generally disposed in a further spatial arrangement for redirecting the pump energy of an associated one of said pump sources into a corresponding one of said pump energy beams.

6. The apparatus according to claim 5, wherein each said collimator is an anamorphic lens assembly.

7. The apparatus according to claim 6, wherein said anamorphic lens assembly includes an aspheric lens in series with one or more cylindrical lenses.

8. The apparatus according to claim 7, wherein said aspheric lens is plano-convex.

9. The apparatus according to claim 4, wherein said optical focusing means include an aspheric lens.

10. The apparatus according to claim 9, wherein said aspheric lens is plano-convex.

11. The apparatus according to claim 10, wherein said aspheric lens has an optical axis being aligned with said optical axis.

12. The apparatus according to claim 1, wherein said input optical signal is to be amplified, said apparatus further comprising an optical signal input device for directing the optical signal to be amplified in the direction of said optical axis to inject said optical signal into a signal input portion of said core, whereby said optical signal is multiplexed with said pump energy within said double-cladding fiber.

13. The apparatus according to claim 12, wherein said optical coupling device is disposed between said signal input device and the signal input portion of said core, said optical signal passing through said optical coupling device prior to be injected.

14. The apparatus according to claim 12, wherein said optical coupling device comprises collimator means disposed in front of said pump sources for redirecting the pump energy into a plurality of pump energy beams and optical focusing means for converging the pump energy beams to the pumping input portion of said inner cladding, and wherein said optical focusing means are disposed between said signal input device and the signal input portion of said core.

15. The apparatus according to claim 14, wherein said optical focusing means include a plano-convex aspheric lens having an optical axis being aligned with the signal input portion of said core.

16. The apparatus according to claim 12, wherein said optical signal input device is located on said core to inject said signal in a counter-propagation direction with reference to the pump energy transferred to said inner cladding.

17. An optical fiber pumping apparatus for use with a double-cladding fiber length in an optical amplifier or laser configuration, said fiber including a single-mode core doped with an active material and disposed within an Inner multi-mode cladding surrounded by an outer cladding, said inner cladding being provided with first and second spaced pumping input portions located at opposed first and second input ends of the inner cladding, said apparatus comprising:
   a first set of pump sources disposed in a first spatial arrangement for radiating pump energy along a first optical axis through a surrounding generally annular area while leaving a middle area for one of an input optical signal injection into the core and an output optical signal extraction from the core;

a first optical coupling device having an optical input portion generally aligned with the first optical axis to collect said pump energy, and having an optical output portion aligned with said first pumping input portion for transferring said pump energy to said inner cladding;

a second set of pump sources disposed in a second spatial arrangement for radiating further pump energy along a second optical axis through a surrounding generally annular area; and a second optical coupling device having an optical input portion generally aligned with the second optical axis to collect said further pump energy, and having an optical output portion aligned with said second pumping input portion for transferring said further pump energy to said inner cladding.

18. The apparatus according to claim 17, wherein each said spatial arrangement is coplanar.

19. The apparatus according to claim 17, wherein said pump sources are laser diodes.

20. The apparatus according to claim 17, wherein each said optical coupling device comprises collimator means disposed in front of said pump sources for redirecting the pump energy into a plurality of pump energy beams and optical focusing means for converging the pump energy beams to corresponding one of said pumping input portions of said inner cladding.

21. The apparatus according to claim 20, wherein said collimator means include a plurality of collimators generally disposed in a further spatial arrangement such that each said collimator redirects the pump energy of an associated one of said pump sources into a corresponding one of said pump energy beams.

22. The apparatus according to claim 21, wherein each said collimator is an anamorphic lens assembly.

23. The apparatus according to claim 22, wherein said anamorphic lens assembly includes an aspheric lens in series with one or more cylindrical lenses.

24. The apparatus according to claim 23, wherein said aspheric lens is plano-convex.

25. The apparatus according to claim 20, wherein said optical focusing means include an aspheric lens.

26. The apparatus according to claim 25, wherein said aspheric lens is plano-convex.

27. The apparatus according to claim 26, wherein said aspheric lens has an optical axis being aligned with corresponding one of said first and second optical axis.

28. The apparatus according to claim 17, wherein said input optical signal is to be amplified, said apparatus further comprising an optical signal input device for directing the optical signal to be amplified in the direction of said first optical axis to inject said optical signal into a signal input portion of said core, whereby said optical signal is multiplexed with said pump energy within said double-cladding fiber.

29. The apparatus according to claim 28, wherein said first optical coupling device is disposed between said signal input device and the signal input portion of said core, said optical signal passing through said first optical coupling device prior to be injected.

30. The apparatus according to claim 28, wherein said core is provided with an output portion, said signal input and output portions being located at opposed first and second ends of said core to provide demultiplexing of said optical signal through the signal output portion of the core.

31. The apparatus according to claim 28, wherein each said optical coupling device comprises collimator means disposed in front of said pump sources for redirecting the pump energy into a plurality of pump energy beams and optical focusing means for converging the pump energy beams to corresponding one of said first and second pumping input portions of said inner cladding, and wherein the focusing means of one of said optical coupling devices are disposed between said signal input device and the signal input portion of said core.

32. The apparatus according to claim 31, wherein each said optical focusing means include a plano-convex aspheric lens having an optical axis being aligned with corresponding one of said first and second spaced pumping input portions.

33. A pumped optical fiber system comprising:
a double-cladding fiber in one of an optical signal amplifier and laser configuration, said fiber including a single-mode core doped with an active material and disposed within an inner multi-mode cladding surrounded by an outer cladding, said inner cladding being provided with a pumping input portion located at an Input end of the Inner cladding;

a plurality of pump sources disposed in a spatial arrangement for radiating pump energy along a optical axis through a surrounding generally annular area while leaving a middle area for one of an input optical signal injection Into the core and an output optical signal extraction from the core; and an optical coupling device having an optical input portion generally aligned with said optical axis to collect said pump energy and having an optical output portion aligned with said pumping input portion for transferring the pump energy to said inner cladding.

34. A pumped optical fiber system comprising:
a double-cladding fiber in one of an optical signal amplifier and laser configuration, said fiber including a singlemode core doped with an active material and disposed within an inner multi-mode cladding surrounded by an outer cladding, said inner cladding being provided with first and second spaced pumping input portions located at opposed first and second input ends of the inner cladding;

a first set of pump sources disposed in a first spatial arrangement for radiating pump energy along a first optical axis through a surrounding generally annular area while leaving a middle area for one of an input optical signal injection into the core and an output optical signal extraction from the core;

a first optical coupling device having an optical input portion generally aligned with said first optical axis to collect said pump energy and having an optical output portion aligned with said first pumping Input portion for transferring the pump energy to said inner cladding;

a second set of pump sources disposed in a second spatial arrangement for radiating further pump energy along a second optical axis through a surrounding generally annular area; and a second optical coupling device having an optical Input portion generally aligned with said second optical axis to collect said further pump energy and having an optical output portion aligned with said second pumping input portion for transferring the further pump energy to said inner cladding.

35. An optical fiber pumping method for use with a double-cladding fiber in an optical amplifier or laser configuration, said fiber including a single-mode core doped with an active material and disposed within an Inner multimode cladding surrounded by an outer cladding portion, said inner cladding being provided with a first pumping input portion located at a first input end of the inner cladding, said method comprising the steps of:

i) radiating pump energy parallel to a first optical axis from a plurality of sources arranged in a first spatial arrangement through a generally annular area surrounding said first optical axis while leaving a middle area for one of an input optical signal injection into the core and an output optical signal extraction from the core;

ii) collecting said pump energy; and iii) transferring the pump energy to said inner cladding at the first pumping input portion.

36. The method according to claim 35, wherein said spatial arrangement is coplanar.

37. The method according to claim 35, further comprising the step of:

iv) injecting in the direction of said optical axis an optical signal to be amplified into signal input portion of said core.

38. The method according to claim 36, wherein said inner cladding is provided with a second pumping input portion located at a second input end of said inner cladding in opposed spaced relationship with said first input end, said method further comprising the steps of:

i') radiating second pump energy parallel to a second optical axis from a plurality of sources arranged in a second spatial arrangement through a generally annular area surrounding said second optical axis;

ii') collecting said second pump energy; and iii') transferring the second pump energy to said inner cladding at said second pumping input portion.

* * * * *